July 23, 1968

R. F. POWELL 3,393,465

ARTIFICIAL BAIT

Filed Aug. 18, 1967

INVENTOR
ROBERT F. POWELL

BY
ATTORNEYS

United States Patent Office 3,393,465
Patented July 23, 1968

3,393,465
ARTIFICIAL BAIT
Robert F. Powell, 101 E. Southerland St.,
Wallace, N.C. 28466
Filed Aug. 18, 1967, Ser. No. 661,583
7 Claims. (Cl. 43—42.28)

ABSTRACT OF THE DISCLOSURE

A fishing apparatus having a hollow cylindrical body with a weighted angularly disposed front end portion for causing erratic motion and a freely movable hook extending outwardly from the rear thereof. The weighted portion is locked to the body by pin means, and the hook is attached to the body by a link connected interiorly of the body to the pin means.

BACKGROUND OF THE INVENTION

Field of the invention

This invention relates generally to fishing lures and particularly to artificial bait having a hollow body with one or more hooks attached thereto. At least portions of the body are colored to attract fish.

Description of the prior art

Many fishing lures have been provided, some of which have had hollow bodies with means for causing erratic movement and with means for attracting fish; however, these devices have been difficult to manufacture and maintain, have not withstood heavy usage, the parts which have worn out have been difficult if not impossible to replace, and have not been satisfactory for these and other reasons.

SUMMARY

The present invention is an artificial bait or lure having a hollow body with a weighted front end positively connected to the body and having an inclined plane which causes erratic motion of the body particularly when a sharp pull is applied to the leader to which the lure is attached. A link is pivotally mounted within the body and extends rearwardly substantially to the end thereof where such link is provided with an eye to which a hook is freely swingably mounted. If desired a bucktail, feather or other material attractive to fish may be connected to the shank of the hook, the link, or to the end of the body.

It is an object of the invention to provide a relatively simple, inexpensive, commercially feasible artificial bait having a hollow body with a weighted head connected at one end and a hook freely swingably mounted at the opposite end.

DESCRIPTION OF THE PREFERRED EMBODIMENTS

Figure 1:
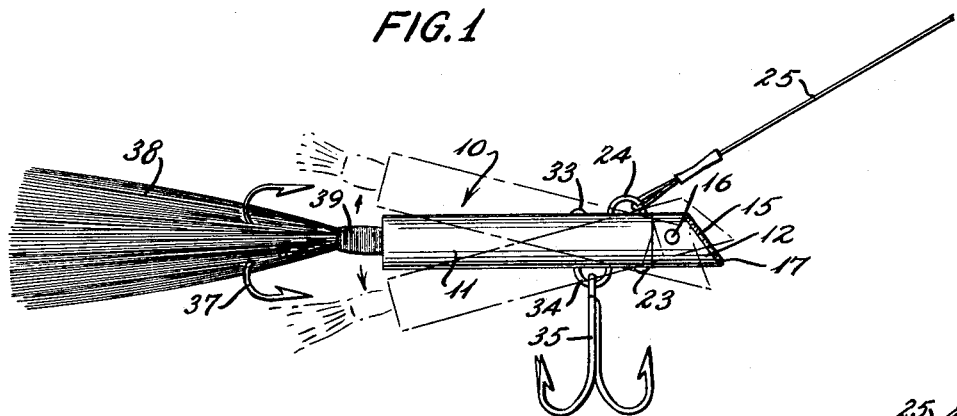
FIG. 1 is a side elevation illustrating one application of the invention.

With continued reference to the drawing, an artificial bait or lure 10 is provided having an elongated generally cylindrical hollow body 11 constructed of any suitable waterproof material such as metal, plastic or the like and preferably has a shiny outer surface. A weighted head 12 having a reduced portion 13 providing a shoulder 14 is located at one end of the body and such head has an inclined surface 15 extending substantially from the top to the bottom in a downwardly and forwardly inclined plane. The inclined surface 15 is to impart an erratic movement to the lure as illustrated in phantom in FIG. 1. An outwardly extending projection 16 is located on each side of the head to represent eyes. Preferably, the inclined surface 15 and the projections 16 are painted with a fluorescent color 17 which can be easily seen in the murky depths where the fish normally swim.

The head 12 has been illustrated as being constructed of a single material such as lead or the like in which the shoulder 14 abuts the end of the body 11; however, it is contemplated that a weighted mass could be located within a moldable material such as plastic to serve the same purpose.

In order to positively connect the head 12 to the body 11, thereby preventing accidental separation, a pair of spaced openings 18 and 19 are provided which extend entirely through the reduced portion 13 and are alignable with pairs of spaced openings 20 and 21 in the top and bottom of the body 11. A first relatively stiff bendable pin 22 having a head 23 at one end is inserted from the bottom of the lure upwardly through the openings 18 and 20 and then is bent to form a loop 24 with the free end of the pin extending through one of the openings 21 and terminating within the opening 19. A leader or fishing line 25 is attached to the loop 24 in any desired manner.

A link 28 having loops or eyes 29 and 30 at opposite ends is located within the body 11 and is freely movable within the confines of the body. In order to slidably and swingably secure one end of the link 28, opposed openings 31 are located in the top and bottom of the body 11 in spaced relation to the head 12 and a second relatively stiff pin 32 having a head or enlargement 33 at one end is inserted from the top through the openings 31 and the eye 29 and then is bent to form a loop 34 with the free end of the pin 32 extending through one of the openings 21 and terminating within the opening 19 in opposed relation to the free end of the pin 22. If desired a hook 35 can be attached to the loop 34 before the pin is inserted in the opening 21 as illustrated in FIGS. 1 and 2, or such hook may be omitted as illustrated in FIGS. 4 and 5.

Figure 2:
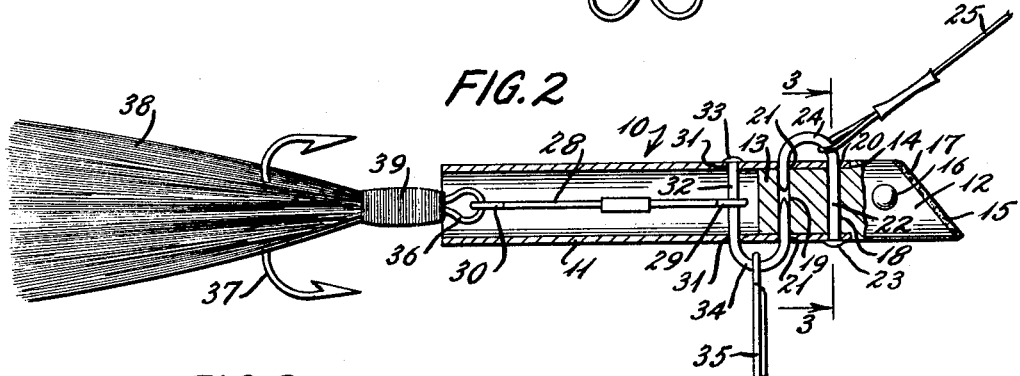
FIG. 2 is an enlarged vertical section thereof.

With reference to FIGS. 1 and 2, the eye 30 on the opposite end of the link 28 is adapted to receive a loop or eye 36 forming the attaching means for a hook 37 located at the rear of the body 11. The hook 37 may have a bucktail, feather or other fish attracting material 38 secured to the shank by thread or windings 39 so that the bucktail will extend outwardly and rearwardly beyond the hook 37. Although any desired material can be used, the bucktail is preferred since by nature it is composed of relatively long hairs which are hollow and which will not tend to cling together when wet. Due to the location of the connection between the eye 36 of the hook and the eye 30 of the link, the hook 37 substantially has free play behind the body.

Figure 3:
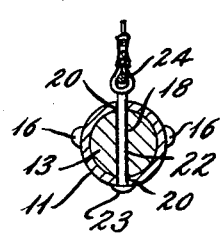
FIG. 3 is a section on the line 3—3 of FIG. 2.
Figure 4:
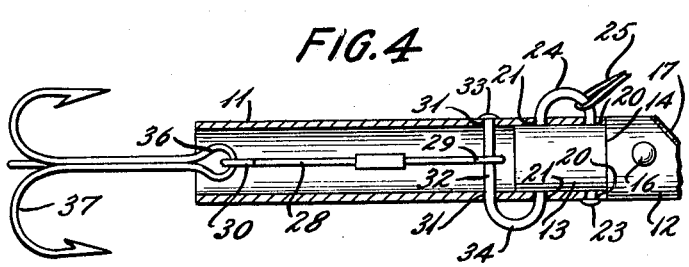
FIG. 4 is a vertical section similar to FIG. 2 of a modified form of the invention.

In the modification illustrated in FIG. 4, the structure of the lure is substantially identical with the lure of FIGS. 1-3 with the exception that the bucktail 38 has been eliminated so that the hook 37 is either bare, or may have live bait such as bloodworms, minnows, shrimp or the like impaled thereon.

Figure 5:
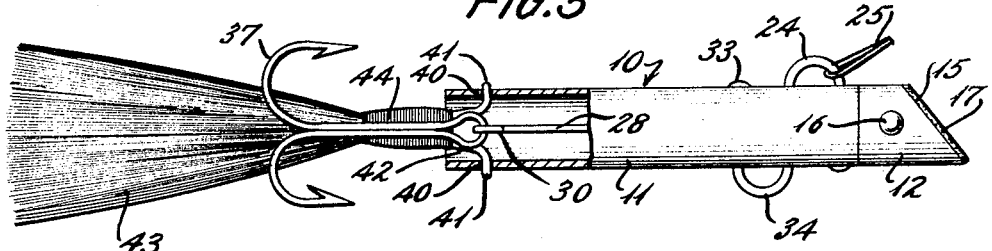
FIG. 5 is a side elevation of a further modified form of the invention with portions broken away for clarity.

With reference to FIG. 5 the structure of the body and head is substantially identical except that a pair of openings 40 are located adjacent to the rear end of the body 11 and such openings are adapted to receive a pair of prongs 41 of a generally U-shaped spring wire 42 to which a bucktail 43 is attached by threads or windings 44. In this modification the bucktail is entirely separate from the hook and can be applied or removed as desired, depending upon the existing conditions.

In the operation of the device the head 12 is inserted within one end of the body 11, the first pin 22 is inserted within the opening 18 after which the leader 25 is passed over such pin and the loop 24 is formed with the free end of the pin extending into the opening 19. The link 28 is attached to the eye 36 of the hook 37 and such link then is positioned within the hollow body so that the second pin 32 can pass through the openings 31 of the body 11 and the eye 29 of the link and thereafter can be inserted within the opening 19. When the device is in use a fishing line is connected either to the leader 25 or directly to the loop 24 and lowered into the water. A sharp pull on the leader will raise the body 12 while simultaneously the inclined surface 15 of the head will cause the head to tilt down and at the same time to move the body sideways and the hook 37 will be inclined upwardly from the rear towards the front. This action simulates the movement of a small fish and the larger fish will strike the lure and be hooked on either the hook 35 or the hook 37.

What is claimed is:

1. An artificial bait comprising a generally cylindrical hollow body, a weighted head disposed at one end of said body, said head having a reduced portion located within said body, said head and said body having first and second spaced aligned openings, a first pin located in said first opening for locking said head to said body, said first pin forming a loop for the reception of a leader, the free end of said first pin being received and terminating within said second opening, said body having third openings spaced rearwardly from said head, a second pin extending through said third openings, said second pin forming a loop and having its free end received and terminating in said second opening in opposed relation to the free end of said first pin, a link having one end slidably and swingably connected to said second pin, the opposite end of said link terminating adjacent to the other end of said body, and hook means pivotally and swingably connected to said opposite end of said link, whereby said head will be positively locked to said body by said pins and said hook means will be freely movable rearwardly of said body.

2. The structure of claim 1 including a lure disposed adjacent to said hook means.

3. An artificial bait comprising an elongated generally cylindrical hollow body, a weighted head located at one end of said body, pin means extending through said body and said head to lock said head to said body and provide means for connecting a leader thereto, that portion of said pin means in said head having the pin axis extending solely transversely of said head, link means interiorly of said hollow body and slidably and swingably connected at one end to said pin means, and hook means pivotally and swingably connected to the opposite end of said link means, whereby said head will be positively connected to said body by said pin means and said hook means will be swingably and rotatably mounted exteriorly of said body.

4. The structure of claim 3 in which said head has a downwardly and forwardly inclined surface for imparting erratic motion to said lure.

5. The structure of claim 3 in which at least portions of said head have a coating of fluorescent material to attract fish.

6. The structure of claim 3 including bucktail means attached to said hook means.

7. The structure of claim 3 including bucktail means connected to said body adjacent to said hook means.

References Cited

UNITED STATES PATENTS

| | | | |
|---|---|---|---|
| 1,611,644 | 12/1926 | Johnson | 43—42.28 X |
| 2,148,784 | 2/1939 | Stewart et al. | 43—42.28 |
| 2,639,537 | 5/1953 | Wagner | 43—42.28 X |
| 2,733,535 | 2/1956 | Rosen | 43—42.39 X |

SAMUEL KOREN, *Primary Examiner.*

J. H. CZERWONKY, *Assistant Examiner.*